United States Patent
Tachino

(10) Patent No.: US 8,522,492 B2
(45) Date of Patent: Sep. 3, 2013

(54) SOLAR PANEL MOUNTING STRUCTURE

(75) Inventor: Takashi Tachino, Tokyo (JP)

(73) Assignee: Eijyu Sangyo Co., Ltd., Fukuoka (JP)

( * ) Notice: Subject to any disclaimer, the term of this patent is extended or adjusted under 35 U.S.C. 154(b) by 87 days.

(21) Appl. No.: 13/214,308

(22) Filed: Aug. 22, 2011

(65) Prior Publication Data

US 2012/0198779 A1   Aug. 9, 2012

(30) Foreign Application Priority Data

Feb. 4, 2011 (JP) .................................. 2011-023038

(51) Int. Cl.
 *E04D 13/18* (2006.01)
(52) U.S. Cl.
 USPC .......................... 52/173.3; 52/202; 52/506.06
(58) Field of Classification Search
 USPC ........... 52/200, 202, 173.1, 58, 71–72, 204.5, 52/173.3, 208, 306–308, 786.1, 796.1, 782.1, 52/506.01, 506.04, 506.06
 See application file for complete search history.

(56) References Cited

U.S. PATENT DOCUMENTS

| | | | | |
|---|---|---|---|---|
| 3,388,418 A * | 6/1968 | Bey | ................................. | 16/320 |
| 4,419,982 A * | 12/1983 | Eckels | ........................ | 126/625 |
| 4,559,753 A * | 12/1985 | Brueske | ....................... | 52/748.1 |
| 4,663,905 A * | 5/1987 | Schulz | ............................ | 52/202 |
| 7,658,039 B2 * | 2/2010 | Ziegelman | ..................... | 52/79.1 |
| 2005/0279347 A1* | 12/2005 | Mejia | ............................. | 126/605 |
| 2007/0074463 A1* | 4/2007 | Ziegelman | ..................... | 52/79.1 |
| 2009/0165841 A1* | 7/2009 | Gunn et al. | .................. | 136/245 |

FOREIGN PATENT DOCUMENTS

| | | |
|---|---|---|
| JP | 2006-57397 | 3/2006 |
| JP | 2009-91811 | 4/2009 |

* cited by examiner

*Primary Examiner* — Jeanette E. Chapman
(74) *Attorney, Agent, or Firm* — Wenderoth, Lind & Ponack, L.L.P.

(57) ABSTRACT

A solar panel mounting structure includes: a fixation member as an angle member firmly fixed onto a roofing composed of a metal plate as a magnetic material; solar panels, each of which is rotatably held on the fixation member while interposing an insertion/extraction hinge mounted on an upper edge of an erected portion of the fixation member; and a magnetic engaging device provided between the solar panel and the roofing in order to detachably fix the solar panel to the roofing. The fixation member is firmly fixed to the roofing while interposing a double-sided adhesive tape and an adhesive agent therebetween. The magnetic engaging device includes: a cup-like casing mounted to a lower surface of the solar panel by a screw; and a ferrite magnet firmly fixed into the casing.

6 Claims, 2 Drawing Sheets

SOLAR PANEL MOUNTING STRUCTURE

BACKGROUND OF THE INVENTION (1) Field of the Invention

The present invention relates to a solar panel mounting structure for use at the time of installing a solar panel to a roof covered with a metal plate as a magnetic material.

(2) Description of Related Art

With regard to a mounting structure for installing a solar panel to a roof covered with a metal plate, various patterns have been heretofore proposed. As a structure related to the invention of this application, for example, there is "an installation apparatus of equipment placed on the roof" described in Japanese Unexamined Patent Application Publication No. 2006-57397 as Patent Document 1 or "a solar panel mounting apparatus" described in Japanese Unexamined Patent Application Publication No. 2009-91811 as Patent Document 2. The apparatus described in each of Patent Documents 1 and 2 has a structure in which the solar panel is fixed to a support formed by assembling predetermined parts to fix them on the roof.

In the apparatus described in Patent Document 1 or 2, a slight gap occurs between the installed solar panel and the roof. Accordingly, with an elapse of time after construction, leaves, dust and the like, which are carried by wind and rain, frequently enter and accumulate in the gap. Leaves, dust and the like, which accumulate in the gap, damage roofing. Accordingly, leaves, dust and the like not only deteriorate an exterior appearance of a building, but also corrode the roofing by maintaining a moisture-containing state, sometimes causing leaks.

In order to prevent such problems, it is necessary to remove leaves, dust and the like by periodically cleaning the gap between the solar panel and the roof. However, the gap is narrow, and it is difficult to insert a cleaning tool and the like thereinto. Accordingly, under the actual circumstances, such cleaning, maintenance and the like of the gap after the construction are hardly performed.

Meanwhile, if the solar panel installed on the roof is lifted up or detached therefrom, then the gap is widened, and the roofing is exposed, and the cleaning, the maintenance and the like become accordingly easy. However, in the apparatus described in each of Patent Literatures 1 and 2, the solar panel is tightly fixed to the roof by screws and the like, and accordingly, it is difficult to detach the solar panel from the roof.

SUMMARY OF THE INVENTION

To solve the problems, it is an object of the present invention to provide a solar panel mounting structure which is excellent in cleaning workability and maintenance easiness after the construction.

A solar panel mounting structure of the present invention includes: a fixation member firmly fixed onto a roofing formed of a magnetic material; a solar panel; and a hinge comprised of a first wing, a second wing and a support shaft joining the first wing and the second wing rotatably. The first wing is fixed on the fixation member, and the second wing is fixed on the solar panel, so that the solar panel is rotatably held on the fixation member while interposing a hinge therebetween. A magnetic engaging device is provided between the solar panel and the roofing in order to detachably fix the solar panel to the roofing.

With such a configuration, the solar panel is held on the fixation member while interposing the hinge therebetween, and the fixation member is firmly fixed onto the roofing. Therefore, the fixation member becomes rotatable about the hinge even after the construction by releasing the magnetic engaging device. Accordingly, if the solar panel is rotated in an erection direction to thereby widen a gap between the solar panel and the roofing, and a state where the roofing is exposed is brought about, then cleaning, maintenance and the like of the roofing can be easily performed. Moreover, it becomes easy to remove leaves, dust and the like, which accumulate in the gap. Accordingly, by periodically performing the cleaning and the maintenance, an occurrence of damage or rain leaking in the roofing can be prevented.

Here, if an insertion/extraction hinge is used as the hinge, then it becomes possible to remove the solar panel itself from the fixation member. Accordingly, not only cleaning workability for the roofing is enhanced, but it also becomes easy to perform the maintenance of the solar panel and replacement work with other solar panels.

Meanwhile, if at least one of an adhesive agent and a double-sided adhesive tape is used as a fixing device for fixing the fixation member to the roofing, then it becomes possible to firmly fix the fixation member to the roofing without using screws, nails and the like. Accordingly, mounting work of the solar panel becomes easy, and an effect is also brought in preventing leaks.

In accordance with the present invention, the solar panel mounting structure can have excellent cleaning workability and each maintenance after the construction.

DETAILED DESCRIPTION OF PREFERRED EMBODIMENTS

Figure 1:
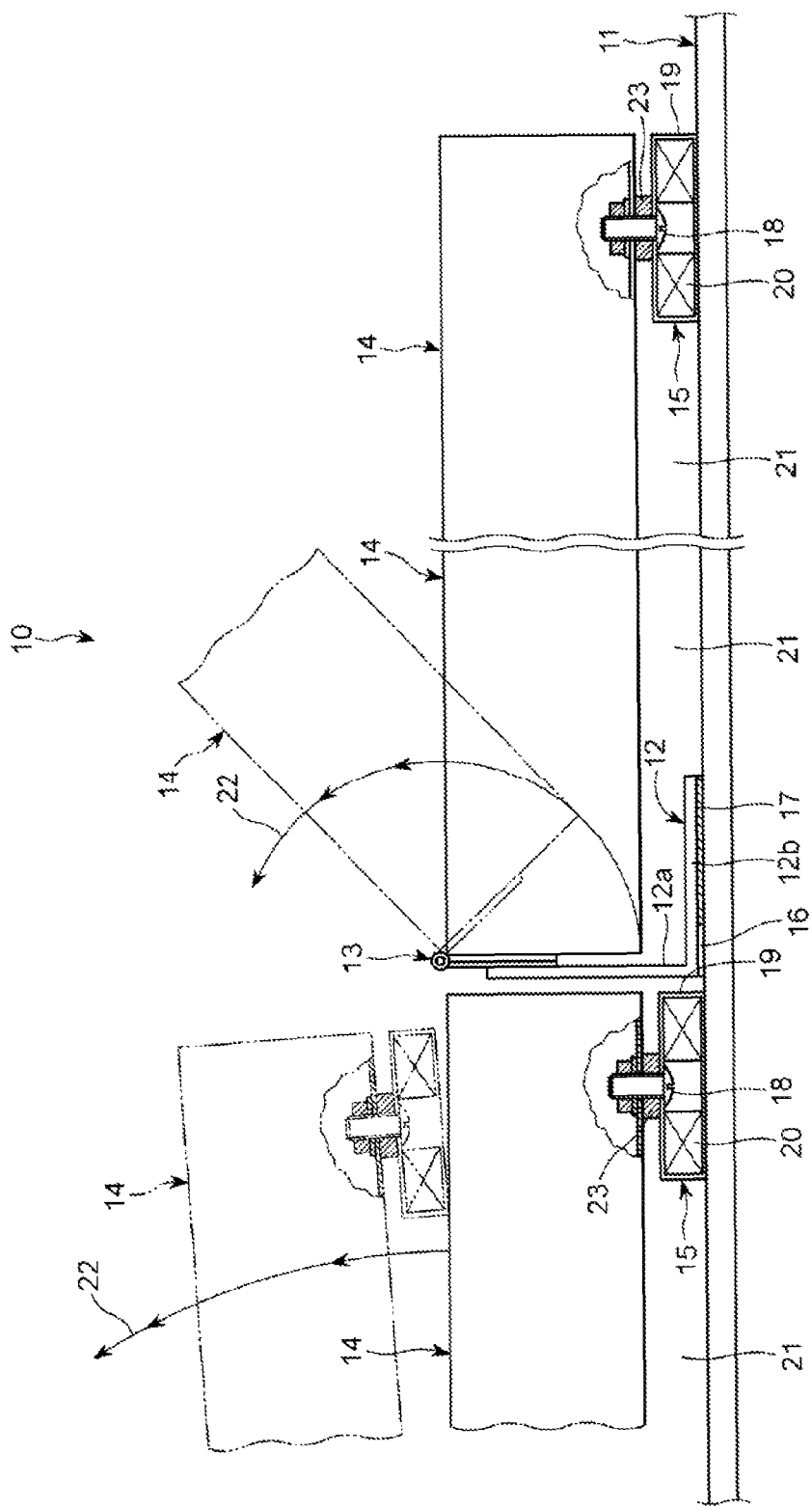
FIG. 1 is a partially-omitted side view showing a solar panel mounting structure according to an embodiment of the present invention.

As shown in FIG. 1, a solar panel mounting structure 10 of this embodiment includes: a fixation member 12 as an angle member, which has an L-shape in cross section, and which is firmly fixed to roofing 11 composed of a metal plate as a magnetic material; solar panels 14, each of which is rotatably held on the fixation member 12 while interposing an insertion/extraction hinge 13 mounted on an upper edge of an erected portion 12a of the fixation member 12; and a magnetic engaging device 15 provided between the solar panel 14 and the roofing 11 in order to detachably fix the solar panel 14 to the roofing 11.

As a device for firmly fixing the fixation member 12 to the roofing 11, a double-sided adhesive tape 16 and an adhesive agent 17 are interposed between a lower surface of a fixed portion 12b of the fixation member 12, which makes a right angle with the erected portion 12a thereof, and a surface of the roofing 11. The double-sided adhesive tape 16 functions as an initial fixing device for the fixation member 12 to the roofing 11, and the adhesive agent 17 functions to strongly fix the fixation member 12 to the roofing 11.

The magnetic engaging device 15 includes: a cup-like casing 19, which interposes an elastic body 23 with a lower surface of each of the solar panels 14, and is mounted thereon by a screw 18 in a state of directing an opening portion downward; and an annular ferrite magnet 20 firmly fixed into the casing 19. If the ferrite magnet 20 exposed to the opening portion of the casing 19 of the magnet engaging device 15 fixed to the lower surface of the solar panel 14 is brought near the roofing 11, then the ferrite magnet 20 is attracted to the roofing 11 by magnetic force. The solar panel 14 is thus fixed to the roofing 11 while a gap 21 is interposed therebetween in a state of remaining substantially parallel thereto.

As mentioned above, the solar panel 14 is rotatably held on the fixation member 12 with the insertion/extraction hinge 13 interposed therebetween, and the fixation member 12 is firmly fixed onto the roofing 11. The solar panel 14 is also fixed by the magnetic engaging device 15 to roofing 11. Accordingly, the solar panel 14 does not float up or is not blown away by wind and rain, and is maintained in a stable state.

Meanwhile, if the magnetic engaging device 15 is released in such a manner that a portion of the solar panel 14, which is opposite to the insertion/extraction hinge 13, is lifted up, or so that a gap between the roofing 11 and the ferrite magnet 20 is widened with force, then as shown in FIG. 1, the solar panel 14 can rotate about the insertion/extraction hinge 13. Hence, if the solar panel 14 is rotated in an erection direction 22 to thereby widen the gap 21 between the solar panel 14 and the roofing 11, and a state where the roofing 11 is exposed is brought about, then cleaning, maintenance and the like of the roofing 11 can be easily performed.

Moreover, by rotating the solar panel 14 in the erection direction 22, it becomes easy to remove leaves, dust and the like, which accumulated in the gap 21. Accordingly, by periodically performing the cleaning and the maintenance, an occurrence of damage or rain leaking through the roofing 11 can be prevented.

Figure 2A:
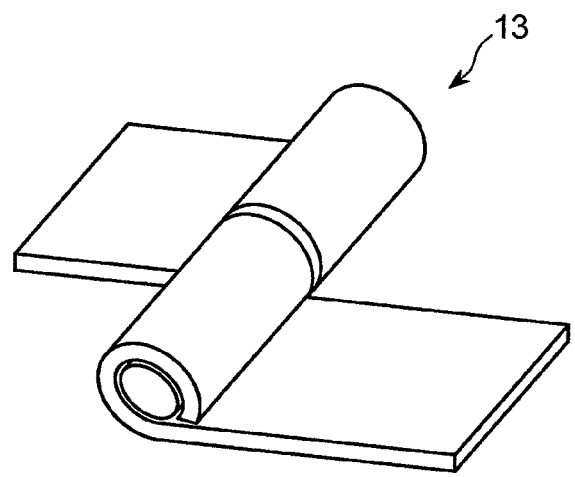
FIGS. 2A and 2B are perspective views each showing an attachment/detachment function of an insertion/extraction hinge that composes the solar panel mounting structure shown in FIG. 1.
Figure 2B:
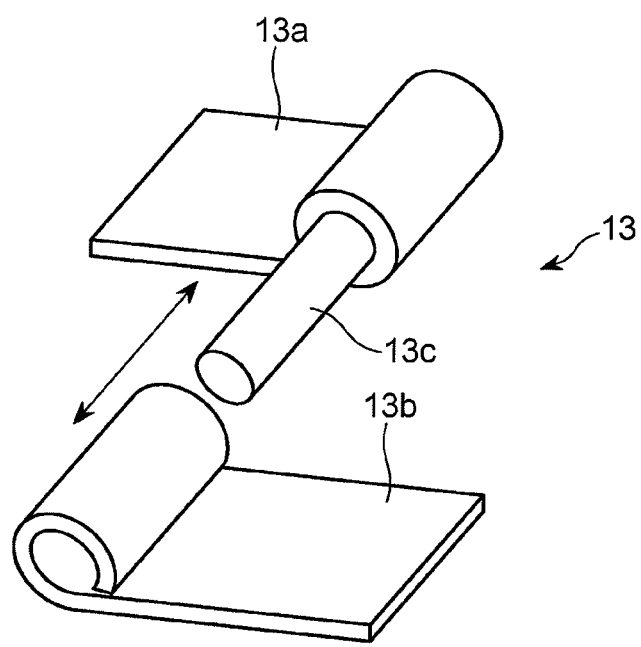

Furthermore, in the insertion/extraction hinge 13 for use in this embodiment, as shown in FIGS. 2A and 2B, from a support shaft 13c fixed to a first wing 13a as one in a pair, a second wing 13b as the other in the pair is detachable. When the insertion/extraction hinge 13 is in a state shown in FIG. 2A, the solar panel 14 is held rotatably about the insertion/extraction hinge 13. However, when the solar panel 14 is slid in a direction parallel to the support shaft 13c of the insertion/extraction hinge 13, then as shown in FIG. 2B, the second wing 13b is removed from the support shaft 13c of the first wing 13a. Accordingly, the solar panel 14 itself can be allowed to be removed from the fixation member 12. If operations reverse to the above are performed, then the solar panel 14 can be mounted on the fixation member 12.

As shown in FIG. 2B, if the solar panel 14 is removed from the fixation member 12 in such a manner that such components of the insertion/extraction hinge 13 are separated from each other, then not only cleaning workability for a portion of the roofing 14 (which is covered with the solar panel 14) is enhanced, but also it becomes easy to perform the maintenance of the solar panel 14 itself and replacement work with other solar panels.

Moreover, as the device for firmly fixing the fixation member 12 to the roofing 11, the double-sided adhesive tape 16 and the adhesive agent 17 are used. Thus, the fixation member 12 can be firmly fixed to the roofing 11 without using screws, nails and the like or providing holes in the roofing 11. Accordingly, mounting work of the solar panel 14 is extremely easy, and rain leaking after construction is prevented.

In this embodiment, the roofing 11 is formed of the metal plate as the magnetic material. Accordingly, the ferrite magnet 20 of the magnetic engaging device 15 can be directly attracted to the roofing 11. In the case where the roofing is not magnetic material, then the metal plate as the magnetic material is firmly fixed to a region on the roofing which is opposite to the magnetic engaging device 15. Thus, it becomes possible to perform such fixation using the magnetic engaging device 15.

The solar panel mounting structure of the present invention can be widely utilized as a technology for installing the solar panel to the building, including the roof covered with the metal plate as the magnetic material.

What is claimed is:

1. A solar panel mounting structure comprising:
    a fixation member to be firmly fixed onto a roofing material by a fixing device comprising at least one of an adhesive agent and a double-sided adhesive tape;
    a solar panel;
    an insertion/extraction hinge including a first wing, a second wing, and a support shaft rotatably joining said first wing and said second wing, said first wing being fixed to said fixation member, and said second wing being fixed to said solar panel so that said solar panel is rotatably attached to said fixation member; and
    a magnetic engaging device between said solar panel and a magnetic portion of the roofing material to detachably fix said solar panel to the roofing material.

2. The solar panel mounting structure of claim 1, wherein said second wing of said hinge is fixed to a first end of said solar panel, and said magnetic engaging device is located at a second end of said solar panel opposite said first end.

3. The solar panel mounting structure of claim 1, wherein said fixation member is L-shaped, said first wing of said hinge being fixed to a leg of said L-shaped fixation member so as to allow said solar panel to rotate about said support shaft of said hinge.

4. The solar panel mounting structure of claim 1, wherein said first wing is fixed to said support shaft, and said second wing is detachably and rotatably attached to said support shaft so as to be pivotable about said support shaft.

5. The solar panel mounting structure of claim 1, wherein said magnetic engaging device includes a cup-shaped casing fixed to said solar panel, and a ferrite magnet firmly fixed within said casing.

6. The solar panel mounting structure of claim 5, wherein said second wing of said hinge is fixed to a first end of said solar panel, and said magnetic engaging device is located at a second end of said solar panel opposite said first end.

* * * * *